United States Patent [19]

Kanda et al.

[11] Patent Number: 4,517,255

[45] Date of Patent: May 14, 1985

[54] METHOD FOR PRODUCTION OF METAL SHEET COVERED WITH POLYESTER RESIN FILM

[75] Inventors: Katsumi Kanda, Kudamatsu; Takaaki Okamura, Yanai; Takashi Minamigi, Hikari; Tsuneo Inui, Tokuyama; Yoshikazu Kondo, Kudamatsu, all of Japan

[73] Assignee: Toyo Kohan Co., Ltd., Tokyo, Japan

[21] Appl. No.: 559,029

[22] Filed: Dec. 7, 1983

Related U.S. Application Data

[63] Continuation-in-part of Ser. No. 398,694, Jul. 15, 1982, abandoned.

[51] Int. Cl.³ ............................................. B32B 15/08
[52] U.S. Cl. .................................. 428/626; 156/309.9; 156/322; 428/472; 428/629; 428/666; 428/667; 428/910
[58] Field of Search ........................... 156/309.9, 322; 428/458, 472, 626, 910, 629, 666, 667

[56] References Cited

U.S. PATENT DOCUMENTS 2,861,022 11/1958 Lundsager .................. 156/322 X
3,679,513 7/1972 Addinall et al. ............. 428/472 X
3,978,803 9/1976 Asano et al. ................ 428/626 X

*Primary Examiner*—Robert A. Dawson
*Attorney, Agent, or Firm*—Wenderoth, Lind & Ponack

[57] ABSTRACT

A method for the production of a metal sheet covered with polyester resin film which comprises laminating a polyester resin film which is preferably crystalline and oriented onto a metal sheet having a lower layer of metallic chromium and an upper layer of hydrated chromium oxide, which sheet has been heated to a temperature above the melting point of polyester resin film and then immediately quenching. This metal sheet covered with polyester resin film is excellent in corrosion resistance and formability.

17 Claims, No Drawings

METHOD FOR PRODUCTION OF METAL SHEET COVERED WITH POLYESTER RESIN FILM

This is a continuation-in-part of Ser. No. 398,694, filed July 15, 1982 and now abandoned.

FIELD OF THE INVENTION

The present invention relates to a method for the production of a metal sheet with polyester resin film laminate. The method comprises laminating the resin film to the surface of a metal sheet having a lower layer of metallic chromium and an upper layer of hydrated chromium oxide. The metal sheet is heated to a temperature above the melting point of polyester resin film, the film is applied and the laminate is rapidly quenched. The polyester resin film is preferably crystalline and oriented.

BACKGROUND AND OBJECTIVES

At present, organic resin film laminated metal sheets are widely used in various fields such as electrical components, furniture and building materials. In general, there are two well-known methods for continuous lamination of an organic resin film on the surface of the metal sheet. The first method is one in which an adhesive coated metal sheet is used. Namely, at first the adhesive in which thermosetting resin is mainly dissolved in a solvent, is coated on the surface of the metal sheet. After curing the adhesive, the organic resin film is laminated on the surface of the metal sheet and then heated in an oven with a large capacity for several minutes. After that, the organic resin film laminated metal sheet is cooled.

The second method is one in which an adhesive coated organic resin film is used. In this case, the organic resin film is laminated on the surface of the metal sheet and then is also heated in the same type of oven as in the first method.

However, these methods have some problems because a long time is required for curing the adhesive and heating after lamination of the organic resin film. For example, the production speed is low, e.g. 10 to 30 m/min. In some cases, the characteristics of the organic resin film such as the corrosion resistance are deteriorated by heating for a long time and the laminated organic resin film may be peeled off from the surface of the metal sheet by severe forming because the formability of thermosetting resin used for the adhesive is not good.

Furthermore, in Laid-Open Japanese Patent Application No. Sho. 53-81530, a modified polyester resin film is used for lamination of the organic resin film on the metal sheet without an adhesive such as a thermosetting resin.

In the can producing industry, continuous lacquer coating at high speed on the metal sheet has been investigated in order to decrease the production cost. However, such process is very difficult to practice industrially, because a lacquer which can be cured by heating for a few seconds has not yet been developed.

Furthermore, the corrosion resistance after forming of the lacquer coated metal sheet is poor as compared with that of the organic resin film laminated metal sheet.

In U.S. Pat. No. 2,861,022, there is disclosed a process for laminating crystalline, oriented, heat-set polyethylene terephthalate film to metal; the surface of said metal is heated to a temperature above the melting point of said polyethylene terephthalate film and thereafter immediately quenching the laminate. It is shown in said U.S. Pat. No. 2,861,022 that the structure of the laminate obtained by the process disclosed therein consists of a bottom layer of metal, an intermediate layer of amorphous polyethylene terephthalate and a top layer of crystalline, oriented, heat-set polyethylene terephthalate film.

However, such laminates, i.e., where the resin film is directly applied to an untreated metal surface, exhibit unsatisfactory properties with respect to film adhesion.

Nothing is disclosed in U.S. Pat. No. 2,861,022 concerning any treatment of the surface of the metal prior to lamination.

Accordingly, it is the first objective of the present invention to provide a metal sheet covered with polyester resin film having an excellent corrosion resistance after forming as compared with that of the lacquer coated metal sheet and other organic resin film laminated metal sheets.

It is the second objective of the present invention to provide a method for the continuous lamination of polyester resin film on the surface of the metal sheet at high speeds such as 100 to 600 m/min.

It is the third objective of the present invention to improve the adhesion of the resin and metal in the laminate of said U.S. Pat. No. 2,861,022.

BRIEF DESCRIPTION OF THE INVENTION

The present invention achieves the above objectives by providing a lower layer of metallic chromium and an upper layer of hydrated chromium oxide on the metal sheet and the polyester resin film is laminated on said upper layer.

More specifically, the method of the present invention is characterized by the lamination of the crystalline and oriented polyester resin film on the surface of the metal sheet having a lower metallic chromium and upper hydrated chromium oxide layer. The sheet is heated above the temperature of the melting point of the polyester resin film and then is rapidly quenched after the lamination of the polyester resin film.

The metal sheet according to the present invention can be used in applications wherein excellent corrosion resistance after severe forming is required, such as drawn cans, drawn and redrawn cans (DR can) as well as can ends.

In these applications, these cans are exposed to hot water or hot steam for the pasteurization of food after packing foods such as fruit juices, coffee, meat and fish. For example, fruit juices are immediately hot-packed in the can after pasteurization at a temperature of 90°~100° C. and coffee, meat and fish are pasteurized by hot steam at a temperature above 100° C. in a retort after being packed in the can at 90°~100° C.

When the polyester resin film laminated metal sheet without the surface treatment according to the present invention is used for the applications described above, a part of polyester resin film may be peeled off in a severely formed part. On the other hand, in the case of a metal sheet covered with double layer consisting of an upper layer of hydrated chromium oxide and a lower layer of metallic chromium per the present invention, the laminated polyester resin film is not at all peeled off in a severely formed part even after a treatment by hot water or hot steam.

DETAILED DESCRIPTION OF THE INVENTION

In the present invention, the employed polyester resin film is prepared by processing polyester resin which is produced by the esterification of at least one saturated polycarboxylic acid by at least one saturated polyalcohol selected from the following polycarboxylic acids and polyalcohols.

Saturated polycarboxylic acids are selected from phthalic acid, isophthalic acid, terephthalic acid, succinic acid, azelaic acid, adipic acid, sebacic acid, 2,6-naphthalene dicarboxylic acid, 1,4-cyclohexane dicarboxylic acid and trimellitic acid anhydride.

Saturated polyalcohols are selected from ethylene glycol, 1,4-butane diol, 1,5-pentane diol, 1,6-hexane diol, propylene glycol, 1,4-dimethanol cyclohexane, trimethylol propane and pentaerythritol.

In some cases, additives such as antioxidants, stabilizers, pigments, antistatic agents and corrosion inhibitors are added during the manufacturing process of the polyester resin film used for the present invention.

In the present invention, the use of polyethylene terephthalate film having biaxial oriented structure is especially desirable from the viewpoint of corrosion resistance and economy.

The thickness of the used polyester resin film should be 5–100 $\mu$m, preferably 5–50 $\mu$m, although it is not limited to such range. However, if the thickness of the employed polyester resin film is below 5 $\mu$m, the excellent corrosion resistance after severe forming in the metal sheet according to the present invention is not obtained.

Moreover, the use of the polyester resin film having a thickness above 100 $\mu$m is not economically suitable for the film to be laminated to the metal sheet, because the polyester resin film used for the present invention is expensive as compared with epoxy phenolic lacquers widely used in the can industry and other organic resin films such as polypropylene film.

The presence of an optimum amount of hydrated chromium oxide and metallic chromium are very important for an excellent adhesion of polyester resin film when said polyester resin film laminated metal sheet is exposed in hot water or hot steam after severe forming.

The optimum range for the amount of hydrated chromium oxide as chromium and metallic chromium is 0.005 to 0.050 g/m$^2$ and 0.01 to 0.20 g/m$^2$, respectively, on said metal sheet.

If the amount of hydrated chromium oxide as chromium is below 0.005 g/m$^2$ or above 0.05 g/m$^2$, the adhesion of polyester resin film in a formed part may become poor, when said polyester resin film laminated metal sheet is exposed to hot water or hot steam. In the case of below 0.01 g/m$^2$ of metallic chromium, the adhesion of polyester resin film may also become poor, even if the amount of hydrated chromium oxide as chromium is 0.005 to 0.050 g/m$^2$. The deposition of metallic chromium above 0.20 g/m$^2$ is not suitable in the continuous production of said polyester resin film laminated metal sheet according to the present invention at high speed, although the adhesion of polyester resin film does not become remarkably poor.

In some applications, the polyester resin film laminated metal sheet herein is reheated at a temperature of about 160° C., because color printing of the surface of said polyester resin film laminated metal sheet is carried out before forming. In this case, it is more desirable to use a metal sheet covered with double layer consisting of a lower layer of metallic chromium of 0.01 to 0.2 g/m$^2$ and an upper layer of hydrated chromium oxide of 0.005 to 0.05 g/m$^2$ as chromium, and wherein sulfur and fluorine are present in addition to chromium and oxygen. The atomic ratio of sulfur and fluorine to the total of chromium, oxygen, sulfur and fluorine in said hydrated chromium oxide is 0.1 to 2.5 atomic % and 0.5 to 10 atomic %, respectively. Then the adhesion of polyester resin film in a severely formed part, under a wet atmosphere, is remarkably good.

Hydrogen also exists as a hydroxyl radical and as bonded water in said hydrated chromium oxide layer. Therefore, the atomic ratio of hydrogen should also be restricted. However, it is represented by the atomic ratio of oxygen, because the quantitative analysis of hydrogen contained in said hydrated chromium oxide is very difficult, and it is therefore apparent that the atomic ratio of hydrogen is in fact so restricted.

It is assumed that the excellent adhesion of polyester resin film in said metal sheet according to the present invention is mainly ensured by the presence of hydroxyl radicals or bonded water in the hydrated chromium oxide. Therefore, the presence of a high amount of sulfur existing as a sulfate radical and fluorine is not desirable so as to ensure the excellent adhesion of polyester resin film, because the amount of hydroxyl radical or bonded water in said hydrated chromium oxide, which is necessary to ensure the excellent adhesion of polyester resin film, is decreased by the substitution of hydroxyl radical or bonded water by sulfate radicals or fluorine.

In the present invention, the reason why the permissible range of the atomic ratio of fluorine is wider than that of sulfur is considered to be that fluorine incorporated into the hydrated chromium oxide layer does not disturb the construction of the hydrated chromium oxide as much as does the sulfate radical, because fluorine has nearly the same volume as the hydroxyl radical or bonded water and sulfate radical has nearly the same volume as trivalent chromium coordinated by a hydroxyl radical or bonded water with a coordination number of 6.

As stated above, the presence of sulfate radical and fluorine in said hydrated chromium oxide is not desirable from the standpoint of excellent adhesion of the polyester resin film. However, in order to efficiently form a uniform hydrated chromium oxide layer with a uniform metallic chromium layer, it is indispensable to add at least one additive selected from the group consisting of sulfur compounds (e.g., sulfuric acid, phenolsulfonic acid or an ammonium or alkali metal sulfate, phenolsulfate, sulfite or thiosulfate) and fluorine compounds (e.g., an ammonium or alkali metal fluoride, fluoborate or fluosilicate, or acid thereof, i.e., hydrofluoric acid, fluoboric acid, fluosilicic acid, ammonium bifluoride or an alkali metal bifluoride) to the chromic acid electrolyte solution.

It is more desirable herein to use the chromic acid electrolyte containing only a fluorine compound, for example, those disclosed in Japanese Patent Publication No. Sho 49-25537, compared with the chromic acid electrolyte containing sulfur compounds such as sulfuric acid, from the viewpoint described above.

The metal sheet herein should be selected from the group consisting of aluminum sheets, steel sheets, steel sheets plated with below 3.0 g/m$^2$ of nickel, steel sheet plated with below 1.0 g/m$^2$ of tin and steel sheets plated with below 3.0 g/m² of nickel and below 1.0 g/m² of tin, because the metal sheet herein is used for sanitary food cans as described above. The amount of plated nickel herein should be below 3.0 g/m² in the continuous production of the metal sheet at high speed. The amount of plated tin should be limited to below 1.0 g/m². If plated tin is above 1.0 g/m², the adhesion of polyester resin film becomes remarkably poor, because a greater part of plated tin remains as free tin without the formation of iron-tin alloy by heating before the lamination of polyester resin film. If the amount of plated nickel and tin is below 0.01 g/m² and 0.05 g/m², respectively, the effect of plated nickel and tin on the characteristics of the metal sheet herein is hardly apparent, despite the addition of a further plating process.

The temperature of the metal sheet heated just before the lamination of the polyester resin film, which is an important factor in the present invention, should be maintained in the range of Tm–Tm+160° C., in which Tm is the melting point of the polyester resin film which exhibits an endothermic peak in an ordinary differential thermal analysis run at a heating rate of 10° C./min., in order to get the excellent bonding strength between the polyester resin film and the metal sheet.

If the temperature of the metal sheet heated just before the lamination of the polyester resin film is above Tm+160° C., the corrosion resistance of the polyester resin film laminated metal sheet deteriorates, because the ratio of the non-oriented part to the oriented part in the laminated polyester resin film will perhaps increase. With a temperature below Tm, the polyester resin film laminated metal sheet having excellent bonding strength is not obtained, because the lower side of the employed polyester resin film in contact with the metal sheet is not sufficiently melted.

Furthermore, the quenching conditions after laminating the polyester resin film on the metal sheet is also one of the important factors in the present invention. Namely, the maximum temperature on the surface, which does not contact the surface of the metal sheet, of the laminated polyester resin film should be below Ts°C., at which the melting of crystals in the polyester resin film starts, preferably below Ts−20° C.

More specifically, Ts represents the temperature at which the endothermic reaction of polyester resin film starts, as determined by ordinary differential thermal analysis which is run at a heating rate of 10° C./min.

If the temperature on the surface of the laminated polyester resin film is above Ts, the characteristics of the metal sheet according to the present invention become remarkably poor.

For example, the appearance of the laminated polyester resin film changes from clear to milky and the corrosion resistance after forming becomes poor.

Furthermore, the quenching time for cooling the metal sheet to below Ts after the lamination of the polyester resin film is also an important factor in the present invention. It should be below 10 seconds. In the case where the quenching time is longer, the corrosion resistance of the polyester resin film laminated metal sheet also becomes remarkably poor, because it is considered that the greater part of the crystalline and oriented structure changes to the non-oriented structure in the laminated polyester resin film.

In the present invention, the method for heating the metal sheet to which the polyester resin film is laminated is not limited. However, from the standpoint of continuous and stable production of the polyester resin film laminated metal sheet at high speed, induction heating and/or resistance heating which are used for reflowing tinplate in the conventional process for production of electrotinplate is suitable as the method for heating the metal sheet to be laminated, because the metal sheet to be laminated is rapidly heated and the temperature of the heated metal sheet is easily controlled. Namely, it is desirable in the present invention that the metal sheet to be laminated is heated in the range of from 1–20 seconds.

Furthermore, in the present invention, various methods were considered for quenching the metal sheet heated above the melting point of the polyester resin film after the lamination of the polyester resin film. However, quenching by water spray, water immersion, liquid nitrogen or employing a roller cooled by water or liquid nitrogen are industrially suitable as the method for quenching the heated metal sheet after the lamination of polyester resin film. The temperature of water used for quenching the heated metal sheet should be kept below 90° C. in consideration of the continuous production of the polyester resin film laminated metal sheet according to the present invention, although it should be kept as low as possible.

The difference in the adhesion of polyester resin film in the metal sheet covered with double layer consisting of an upper layer of hydrated chromium oxide and a lower layer of metallic chromium from that in the metal sheet without chromic acid treatment is explained in further detail by the following Examples.

EXAMPLE 1

A cold rolled steel sheet having a thickness of 0.25 mm was electrolytically degreased in a solution of 70 g/l sodium hydroxide and then pickled in a solution of 100 g/l sulfuric acid. The steel sheet, after being rinsed with water, was cathodically treated by using an electrolyte consisting of 30 g/l of $CrO_3$ and 1.5 g/l of NaF in water under 20 A/dm² of cathodic current density at an electrolyte temperature of 30° C. The thus treated steel sheet was rinsed with hot water having a temperature of 80° C. and dried.

EXAMPLE 2

The steel sheet was cathodically treated by using an electrolyte consisting of 80 g/l of $CrO_3$, 0.25 g/l of $H_2SO_4$ and 0.6 g/l in $HBF_4$ in water under 25 A/dm² of cathodic current density at an electrolyte temperature of 55° C. after the pretreatment as in Example 1. The thus treated steel sheet was rinsed with hot water having a temperature of 55° C. and dried.

COMPARATIVE EXAMPLE 1

The steel sheet was rinsed with water and dried after the pretreatment as in Example 1.

EXAMPLE 3

The steel sheet was electroplated with 0.3 g/m² of Sn by using an electrolyte consisting of 25 g/l of stannous sulfate, 15 g/l of phenolsulfonic acid (60% aqueous solution) and 2 g/l of ethoxylated α-naphthol sulfonic acid in water under 20 A/dm² of cathodic current density at an electrolyte temperature of 40° C. after the pretreatment as in Example 1. After rinsing with water, the tin plated steel sheet was cathodically treated by using an electrolyte consisting of 50 g/l of $CrO_3$ and 0.5 g/l of $H_2SO_4$ in water under 25 A/dm² of cathodic current density at an electrolyte temperature of 50° C.

The thus treated steel sheet was rinsed with hot water having a temperature of 80° C. and dried.

COMPARATIVE EXAMPLE 2

The steel sheet was electroplated with 0.3 g/m² of Sn under the conditions of Example 3 after the pretreatment as in Example 1. The tin plated steel sheet was rinsed with water and dried without electrolytic acid treatment.

EXAMPLE 4

The steel sheet was electroplated with 0.6 g/m² of Ni by using a Watt's bath consisting of 40 g/l of $NiCl_2.6H_2O$, 250 g/l of $NiSO_4.6H_2O$ and 40 g/l of $H_3BO_3$ in water under 10 A/dm² of cathodic current density at a bath temperature of 40° C. after the pretreatment as in Example 1. After rinsing with water, the nickel plated steel sheet was cathodically treated by using an electrolyte consisting of 50 g/l of $CrO_3$ and 2.0 g/l of $NH_4F$ in water under 30 A/dm² of cathodic current density at an electrolyte temperature of 45° C. The thus treated steel sheet was rinsed with hot water having a temperature of 80° C. and was dried.

COMPARATIVE EXAMPLE 3

The steel sheet was electroplated with 0.6 g/m² of Ni under the conditions of Example 4 after the pretreatment as in Example 1. The nickel plated steel sheet was rinsed with water and dried without electrolytic chromic acid treatment.

EXAMPLE 5

An aluminum sheet (JIS 3004) having a thickness of 0.23 mm was cathodically degreased in a solution of 30 g/l sodium carbonate. After being rinsed with water, the aluminum sheet was cathodically treated by using an electrolyte consisting of 50 g/l of $CrO_3$, 0.3 g/l of $H_2SO_4$ and 0.16 g/l of $HBF_4$ in water under 20 A/dm² of cathodic current density at an electrolyte temperature of 55° C. The thus treated aluminum sheet was rinsed with hot water having a temperature of 80° C. and dried.

COMPARATIVE EXAMPLE 4

The aluminum sheet was rinsed with water and dried after the pretreatment as in Example 5.

A crystalline and oriented polyester resin film (Trade name: Lumirror S made by Tore Co., Ltd.) having a thickness of 16 μm was laminated on the steel sheet and aluminum sheet treated under the conditions of Examples 1 to 5 and Comparative Examples 1 to 4 under the following conditions and was quenched.

Conditions for the lamination of polyester resin film:
Temperature of the treated steel sheet or aluminum sheet just before the lamination . . . 290° C.
Maximum temperature on the surface of the laminated polyester resin film between laminating and quenching . . . 200° C.
Time for quenching to 100° C. on the surface of the laminated polyester resin film . . . 3 sec.

The adhesion of polyester resin film in the resultant steel sheet and aluminum sheet was evaluated by the following test methods, after the measurement of the coating weight on the resultant steel sheet and aluminum sheet by the X-ray fluorescent method, the results of which are shown in the Table.

(1) The adhesion of the polyester resin film laminated metal sheet after the retort treatment:

The polyester resin film laminated sample was cut into a circular blank having a diameter of 80 mm by a punch press, and the blank was deeply drawn to form a cup in which the polyester laminated side was inside at a drawing ratio of 2.0.

The drawn cup was set in a retort into which steam, heated to 125°~130° C. under a pressure of 1.6~1.7 kg/cm², was blown for 1 hour. After that, the adhesion of the polyester resin film was divided into 5 ranks, namely 5 was excellent, 4 was good, 3 was fair, 2 was poor and 1 was bad.

(2) The adhesion of the polyester resin film laminated metal sheet which is reheated before forming, after the retort treatment:

The polyester resin film laminated sample was reheated at a temperature of 160° C. for 10 minutes and then was tested under the conditions as shown in (1).

TABLE

|  | Ex. 1 | Ex. 2 | Comp. ex. 1 | Ex. 3 | Comp. ex. 2 | Ex. 4 | Comp. ex. 3 | Ex. 5 | Comp. ex. 4 |
|---|---|---|---|---|---|---|---|---|---|
| Base steel | Steel | Steel | Steel | Steel | Steel | Steel | Steel | Aluminum | Aluminum |
| Plated metal (g/m²) | None | None | None | Sn 0.03 | Sn 0.3 | Ni 0.06 | Ni 0.6 | None | None |
| *¹$Cr^o$ (g/m²) | 0.11 | 0.10 | 0 | 0.03 | 0 | 0.09 | 0 | 0.05 | 0 |
| $Cr^{ox}$ (g/m²) | 0.015 | 0.020 | 0 | 0.007 | 0 | 0.03 | 0 | 0.005 | 0 |
| *²S (Atomic %) | 0.5 | 3.1 | 0 | 4.0 | 0 | 0.3 | 0 | 1.7 | 0 |
| F (Atomic %) | 8.0 | 4.6 | 0 | 0 | 0 | 6.2 | 0 | 1.0 | 0 |
| Adhesion of polyester resin film by test (1) | 5 | 5 | 2 | 4 | 2 | 5 | 3 | 5 | 3 |
| Adhesion of polyester resin film by test (2) | 5 | 4 | 1 | 3 | 1 | 5 | 2 | 4 | 2 |

Remarks:
*¹$Cr^o$ shows metallic Cr and $Cr^{ox}$ shows Cr in the hydrated Cr oxide formed by an electrolytic chromic acid treatment.
*²S shows existing as sulfate radical and F shows F incorporated in the formed hydrated Cr oxide.

We claim:

1. A method for laminating a polyester resin film to a metal sheet covered with double layer consisting of an upper layer of hydrated chromium oxide having sulfur and fluorine therein, the atomic ratio of sulfur and fluorine to the total of chromium, oxygen, sulfur and fluorine in the hydrated chromium oxide being 0.1 to 2.5 atomic % and 0.5 to 10 atomic %, respectively, and a lower layer of metallic chromium, which comprises heating the metal sheet to a temperature above the melting point of said polyester resin film, placing the film thereon and then quenching the laminate.

2. The method according to claim 1 wherein said polyester resin film has a crystalline and oriented structure.

3. The method according to claim 2 wherein said polyester resin film is produced by the esterification of a saturated polycarboxylic acid selected from the group consisting of phthalic acid, isophthalic acid, terephthalic acid, succinic acid, azelaic acid, adipic acid, sebacic acid, 2,6-naphthalene dicarboxylic acid, 1,4-cyclohexane dicarboxylic acid and trimellitic acid anhydride with a saturated polyalcohol selected from the group consisting of ethylene glycol, 1,4-butane diol, 1,5-pentane diol, 1,6-hexane diol, propylene glycol, 1,4-dimethanol cyclohexane, trimethylol propane and pentaerythritol.

4. The method according to claim 1 wherein said metal sheet is a sheet or strip of steel or aluminum.

5. The method according to claim 1 wherein said metal sheet is a sheet or strip of steel plated with 0.01 to 3.0 g/m$^2$ of nickel.

6. The method according to claim 1 wherein said metal sheet is a sheet or strip of steel plated with 0.05 to 1.0 g/m$^2$ of tin.

7. The method according to claim 1 wherein said metal sheet is a sheet or strip of steel plated with 0.01 to 3.0 g/m$^2$ of nickel and 0.05 to 1.0 g/m$^2$ of tin.

8. The method according to claim 1 wherein said double layer consists of an upper layer of hydrated chromium oxide having 0.005 to 0.05 g/m$^2$ as chromium and a lower layer of metallic chromium of 0.01 to 0.2 g/m$^2$.

9. The method according to claim 1 wherein the temperature of said metal sheet covered with double layer consisting of an upper layer of hydrated chromium oxide and a lower layer of metallic chromium heated just before the lamination of said polyester resin film is maintained in the range of $Tm \sim Tm + 160°$ C. in which Tm represents the melting point of said polyester resin film.

10. The method according to claim 1 wherein said metal sheet covered with double layer consisting of an upper layer of hydrated chromium oxide and a lower layer of metallic chromium is heated to $Tm \sim Tm + 160°$ C. within 20 seconds using resistance heating, induction heating or both.

11. The method according to claim 1 wherein the maximum temperature on the surface of the laminated polyester resin film is kept below Ts, between the laminating polyester resin film and quenching the laminated metal sheet, in which Ts represents the temperature for the start of and endothermic reaction of the polyester resin film.

12. The method according to claim 11 wherein the maximum temperature on the surface of the laminated polyester resin film is kept below $Ts - 20°$ C.

13. The method according to claim 1 wherein the quenching time to below Ts, on the surface of the laminated polyester resin film, is below 10 seconds, said quenching being performed by spray of water kept below 90° C., immersion into water kept below 90° C. or liquid nitrogen or a roller cooled by water or liquid nitrogen.

14. The method according to claim 1 wherein the thickness of said polyester resin film is 5 to 100 μm.

15. The method according to claim 15 wherein the thickness of said polyester resin film is 5 to 50 μm.

16. The method according to claim 1 wherein said polyester resin film is polyester resin film having biaxially oriented structure.

17. The polyester resin film laminated metal sheet which is covered with double layer consisting of an upper layer of hydrated chromium oxide and a lower layer of metallic chromium according to any one of claims 1 to 8 or 9 to 16.

* * * * *